(12) United States Patent
Ambrose et al.

(10) Patent No.: US 6,984,916 B2
(45) Date of Patent: Jan. 10, 2006

(54) INTEGRATED COMMUTATOR WITH SENSE MAGNET

(75) Inventors: Jennifer Ambrose, Yardley, PA (US); Brian Loseke, Cary, NC (US)

(73) Assignee: Energy Conversion Systems Holdings, LLC, Dunn, NC (US)

( * ) Notice: Subject to any disclaimer, the term of this patent is extended or adjusted under 35 U.S.C. 154(b) by 20 days.

(21) Appl. No.: 09/932,201

(22) Filed: Aug. 17, 2001

(65) Prior Publication Data

US 2003/0193261 A1 Oct. 16, 2003

(51) Int. Cl.
*H02K 23/66* (2006.01)
*H02K 11/00* (2006.01)

(52) U.S. Cl. .............. 310/237; 310/233; 310/68 B; 310/43

(58) Field of Classification Search ........... 310/233, 310/235, 236, 68 B, 43, 239, 75 R; 30/237; 324/174, 207.2, 207.11
See application file for complete search history.

(56) References Cited

U.S. PATENT DOCUMENTS

| | | | | |
|---|---|---|---|---|
| 2,645,732 A | * | 7/1953 | Marsal ................ | 310/233 |
| 3,983,431 A | * | 9/1976 | Hancock ............. | 310/233 |
| 4,228,396 A | | 10/1980 | Palombo et al. .... | 324/163 |

(Continued)

FOREIGN PATENT DOCUMENTS

| | | |
|---|---|---|
| EP | 0 743 719 A2 | 11/1996 |
| EP | 1 117 174 A1 | 7/2001 |
| FR | 2 663 798 | 12/1991 |
| JP | 04-168964 * | 6/1992 |
| JP | 223889 * | 8/1996 |
| JP | 09 065620 A | 3/1997 |
| JP | 2002504797 A | 8/1999 |
| JP | 11-252866 * | 9/1999 |
| JP | 11308812 | 11/1999 |
| WO | WO99/43071 * | 8/1999 |
| WO | WO 03/075438 A1 | 9/2003 |

OTHER PUBLICATIONS

Translation of 08–223,889. Aug. 30, 1996.*
Translation of Japanese Patent 11–308,812, Nishimura et al., Nov. 1999.*
Translation of French Patent 2 663 798, Schechinger et al., Dec. 1991.*
International Search Report in related PCT/US02/26126, Nov. 26, 2002.
"Commutator Seminar–Excellence through Continual Improvement" Morganite Inc.—Commutator Division ISO 9002/QS9000 certified (20 pages) (dated prior to Aug. 17, 2001).
Kirkwood http://www.Kirkwood–ind.com/products.html (4 pages) (Nov. 10, 2000).
European Search Report for EP 04 25 01218 dated Apr. 28, 2004.

*Primary Examiner*—Karl Tamai
(74) *Attorney, Agent, or Firm*—McCarter & English, LLP

(57) ABSTRACT

A commutator 10 is equipped with a magnet 1 for use in detecting and diagnosing motor inefficiencies and problems as well as in adjusting motor parameters to impact motor operation. The commutator comprises a shell 12, an insulating core 14 positioned adjacent the shell, and at least one magnet positioned adjacent the core. Magnetic sensors placed within the motor housing detect and read the flux lines emitted from the magnet on the commutator. The magnet is preferably integrally-formed with the commutator, thereby facilitating its retention in the motor housing, and is preferably manufactured from an electrically non-conductive material and therefore does not impact, in and of itself, the operation of the motor.

19 Claims, 5 Drawing Sheets

U.S. PATENT DOCUMENTS

| | | | | |
|---|---|---|---|---|
| 4,529,900 A | * | 7/1985 | Uzuka | 310/43 |
| 4,535,264 A | | 8/1985 | Allport | 310/232 |
| 4,678,616 A | * | 7/1987 | Kawashima | 264/24 |
| 4,857,784 A | | 8/1989 | Mukaekubo | 310/68 B |
| 4,952,830 A | | 8/1990 | Shirakawa | 310/68 B |
| 5,111,098 A | | 5/1992 | Peck et al. | 310/268 |
| 5,272,402 A | | 12/1993 | Blaser et al. | 310/68 B |
| 5,279,503 A | | 1/1994 | Propst | 417/319 |
| 5,281,911 A | | 1/1994 | Caron et al. | 324/174 |
| 5,491,373 A | | 2/1996 | Cooper et al. | 310/235 |
| 5,500,564 A | | 3/1996 | Sano et al. | 310/83 |
| 5,517,067 A | | 5/1996 | Sata | 310/68 B |
| 5,596,271 A | | 1/1997 | Lowery | 324/174 |
| 5,760,518 A | | 6/1998 | Abe et al. | 310/237 |
| 5,826,324 A | | 10/1998 | Abe et al. | 29/597 |
| 5,850,141 A | * | 12/1998 | Adler | 324/174 |
| 5,998,892 A | | 12/1999 | Smith et al. | 310/68 B |
| 6,013,960 A | | 1/2000 | Yoshida | 310/68 B |
| 6,013,961 A | * | 1/2000 | Sakamaki | 310/68 B |
| 6,020,663 A | | 2/2000 | Furuki | 310/68 B |
| 6,091,171 A | | 7/2000 | Ohishi et al. | 310/68 B |
| 6,198,185 B1 | | 3/2001 | Bruhn et al. | 310/68 B |
| 6,236,136 B1 | | 5/2001 | Hockaday et al. | 310/268 |
| 6,278,269 B1 | * | 8/2001 | Vig et al. | 324/207.2 |
| 6,326,716 B1 | | 12/2001 | Niimi et al. | 310/239 |
| 6,340,856 B1 | * | 1/2002 | Schiller | 310/156.22 |
| 6,369,484 B1 | * | 4/2002 | Kageyama et al. | 310/233 |
| 6,400,050 B1 | | 6/2002 | Naman et al. | 310/68 B |
| 6,710,480 B1 | * | 3/2004 | Baumeister et al. | 310/68 B |

* cited by examiner

INTEGRATED COMMUTATOR WITH SENSE MAGNET

FIELD OF THE INVENTION

This invention relates to commutators equipped with magnets for use with electric motors and methods of manufacturing such commutators.

BACKGROUND OF THE INVENTION

To diagnose problems and to gauge and control the operating characteristics of brush-type direct current ("DC") motors, motor manufacturers and users have resorted to a variety of sensing methods, including optical encoders (which can add cost to the motor) and estimations based upon back electromotive force ("EMF") from the rotor (which are usually not entirely accurate).

Magnets have also been incorporated into the motor assembly to provide feedback on motor function. A magnet is typically mounted on the rotor shaft and coupled with a variable reluctance ("VR") sensor or a Hall-Effect sensor. Such a sensor arrangement costs less than optical encoders and is more accurate than back EMF detection. Using conventional manufacturing methods, however, incorporation of a magnet into the motor assembly results in handling of additional components and addition of steps to the manufacturing process. Both of these factors increase the manufacturing costs of motors having motor function sensing capabilities.

In addition to increased motor costs, traditional methods of incorporating a sense magnet into the motor assembly, generally by gluing the magnet onto the rotor shaft or by pressing the magnet onto a knurl located on the rotor shaft, have proven ineffective to retain the magnet in the housing, thereby leading to failure of the sensing device. When the shaft rotates at high revolutions per minute (rpms), the glue bond oftentimes is insufficient to retain the magnet on the shaft. Alternatively, the magnet can disengage from the knurl during operation of the motor. The improperly-secured magnets can lead to the magnet breaking away from the shaft. The magnets are therefore unable to relay flux lines to the sensors and thereby facilitate the collection of information regarding motor function.

SUMMARY OF THE INVENTION

The present invention solves the problems of previous sensing devices by providing a commutator equipped with a magnet for use in detecting and diagnosing motor inefficiencies and problems as well as in adjusting motor parameters to impact motor operation. Magnetic sensors placed within the motor housing detect and read the flux lines emitted from the magnet on the commutator. The magnet is preferably integrally-formed with the commutator, thereby facilitating its retention in the motor housing. The sense magnet is then magnetized with an array of magnetic North and South poles depending on the need of the application. Because the magnet is preferably manufactured from a non-electrically conductive material, it does not impact, in and of itself, the operation of the motor. Rather, the output from the sensors of the magnitude and/or frequency of the magnetic poles can be used to determine operating characteristics of the motor (such as speed, angular position, acceleration, etc.) and thereby allow the user to detect and diagnose problems in the motor and adjust parameters (such as current) of the motor to impact its operation and performance. Inclusion of a magnet thereby transforms the commutator, which, in the past, has served solely to supply power to the motor armature, into a powerful diagnostic and monitoring tool.

According to the present invention, in a commutator for a motor, the commutator includes at least one magnet.

In a preferred embodiment of the present invention, the at least one magnet is integral with the commutator.

Also, according to the present invention, a sensing assembly includes a commutator having a shell; an insulating core positioned adjacent the shell; and at least one magnet positioned adjacent the core.

Again, according to the present invention, method of manufacturing a commutator comprises providing a shell; providing a magnet; positioning the magnet at least partially adjacent the shell; and positioning an electrically-insulative core in contact with the magnet and the shell.

It is a feature and object of the present invention to improve the integrity of a motor function sensor assembly by integrally-forming the magnet of the assembly with the motor commutator.

It is another feature and object of the present invention to obviate the need for and expense of additional mechanical retention means to retain the magnet of the motor function sensor assembly in the motor housing.

DETAILED DESCRIPTION OF THE DRAWINGS

Figure 1:
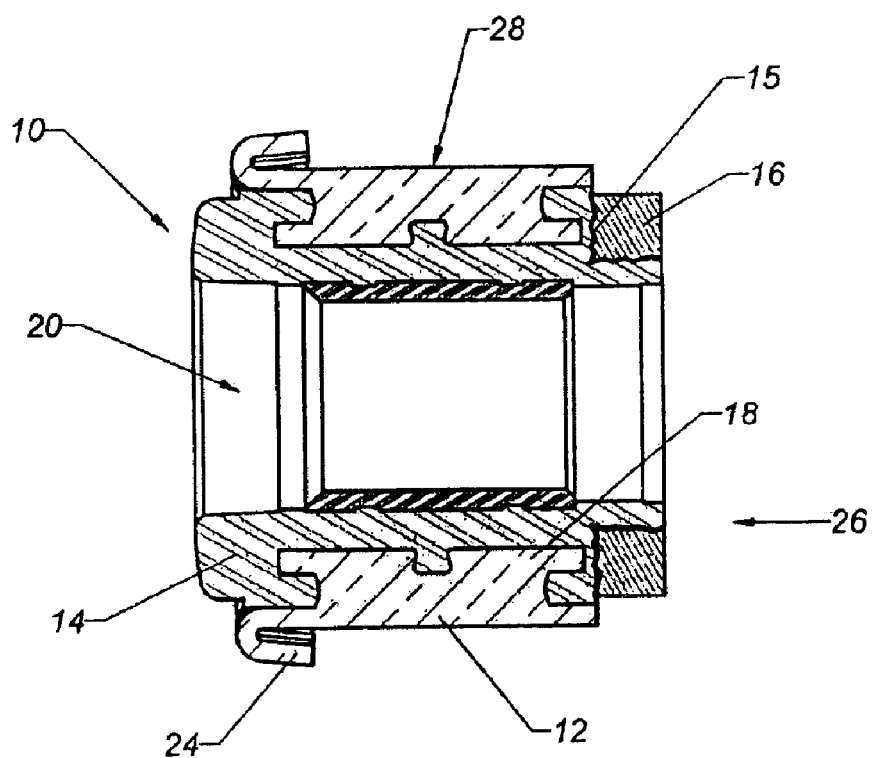
FIG. 1 is a cross-sectional view of one embodiment of the commutator according to the present invention.

FIG. 1 provides a cross-sectional view of an embodiment of an exemplary commutator 10 according to the present invention. Note, however, that magnets may be incorporated into any type of commutator, and their use is not limited to use in only those commutators discussed and disclosed in the present application. For example, U.S. Pat. No. 5,491,373 to Cooper et al., the entirety of which is incorporated herein by reference, discloses a barrel-style commutator having multiple electrically-conductive copper segments arranged into a cylinder on the outer diameter of the non-conductive core to form the shell of the commutator. The motor brush interacts with the copper segments to supply power to the armature. U.S. Pat. Nos. 5,760,518 and 5,826,324 to Abe et al. (also incorporated herein in their entireties by this reference) disclose a face-style commutator having electrically-conductive graphite segments located on the face of the commutator for conducting electricity.

Alternatively, U.S. Pat. No. 6,236,136 ("'136 Patent") to Hockaday et al., the entirety of which is incorporated herein by reference, discloses both a face-style and a barrel-style commutator having carbon pre-forms located on the face or the barrel of the commutator, respectively. While, as with the commutator of Cooper et al., a metal shell forms the outer diameter of the commutator, the carbon pre-forms (not the metal shell as in Cooper et al.) are the principle conductors of electricity in the '136 patent.

The commutator 10 of FIG. 1 includes an outer electrically-conductive shell 12, tangs 24, an electrically-insulative core 14, and at least one magnet 16. The shell 12 may be made from copper or any suitable metal. While not necessary, at least one anchor 18 preferably extends radially inward from the shell 12.

The magnet 16 is preferably, but does not have to be, formed before its incorporation into the assembly. The magnet 16 may be made from a so-called "green" pre-form mixture of magnet powder and thermo-set resin binder, which is subsequently heated and/or compressed and/or otherwise cured to form the final magnet. The magnet powder may be of any magnet material. Non-electrically conductive magnet materials, such as strontium ferrite (SrFe) or barium ferrite (BaFe), however, have proved especially useful in this application. While the magnet 16 may be formed using other techniques, such as by curing, it is preferably formed by compressing the powder mixture into a mold, which may be performed under no or minimal heat. While the magnet 16 may be molded into any shape, because commutators are typically cylindrical, a continuous magnet ring (see FIGS. 2–4) is preferable. The commutator 10 is not limited to a single magnet, but may be equipped with multiple magnets. The magnet or magnets may be magnetized with an array of magnetic poles either on the outer diameter, the top face, or both.

Figure 5:
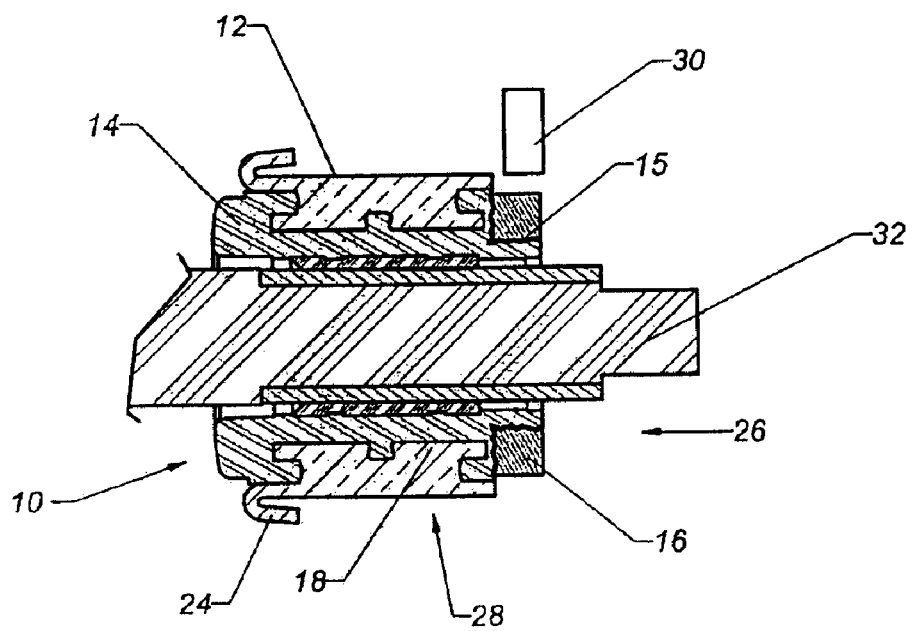
FIG. 5 is a cross-sectional view of the commutator embodiment of FIG. 1 mounted on a shaft and a sensor positioned relative to the commutator.

The core 14 is made of electrically-insulative material, typically (although not necessarily) phenolic, and defines a central aperture 20 for receiving a spindle or shaft 32 in use (see FIG. 5). The core 14 preferably contacts the magnet 16 to secure the magnet 16 in the commutator 10. Moreover, the core 14 also surrounds the anchor 18, thereby securing the core 14 in position relative to the shell 12.

While the shell 12, magnet 16, and core 14 of the commutator 10 may be assembled such as by welding or gluing the components together, the commutator 10 is preferably manufactured using a method that obviates the need for such retention means, but rather relies on the commutator's 10 design and materials to impart stability to the assembly. In one possible manufacturing process, the magnet pre-form 16 and shell 12 are first positioned within the commutator mold. Note, however, that a pre-formed magnet need not be used. Instead of pre-forming the magnet powder mixture into the magnet, the powder mixture could simply be poured directly into the mold. Regardless, after the magnet material (whether pre-formed into a magnet or in powder form) and shell 12 are positioned within the mold, the phenolic core 14 is injection-molded into the mold. The act of such molding embeds portions of the anchor 18 within the core 14, thereby securing its position relative to the shell 12. Moreover, the molded core 14 also intimately contacts the already-placed magnet 16. The high pressures and temperatures used to mold the core 14 likewise concurrently mold the magnet 16, bonding the core 14 and magnet 16 together at their interface (typically via inter-bonding of resins contained in both the core 14 and the magnet 16 ) and mechanically interlocking features (i.e. protrusions and cavities not shown) on their adjoining surfaces (or possibly created by at least slight deformation of either or both components during the molding process). This chemical bonding (illustrated by darkened lines 15 in FIGS. 1–5) and mechanical interlock between the core 14 and magnet 16 functions to secure the magnet 16 within the shell 12.

Figure 2:
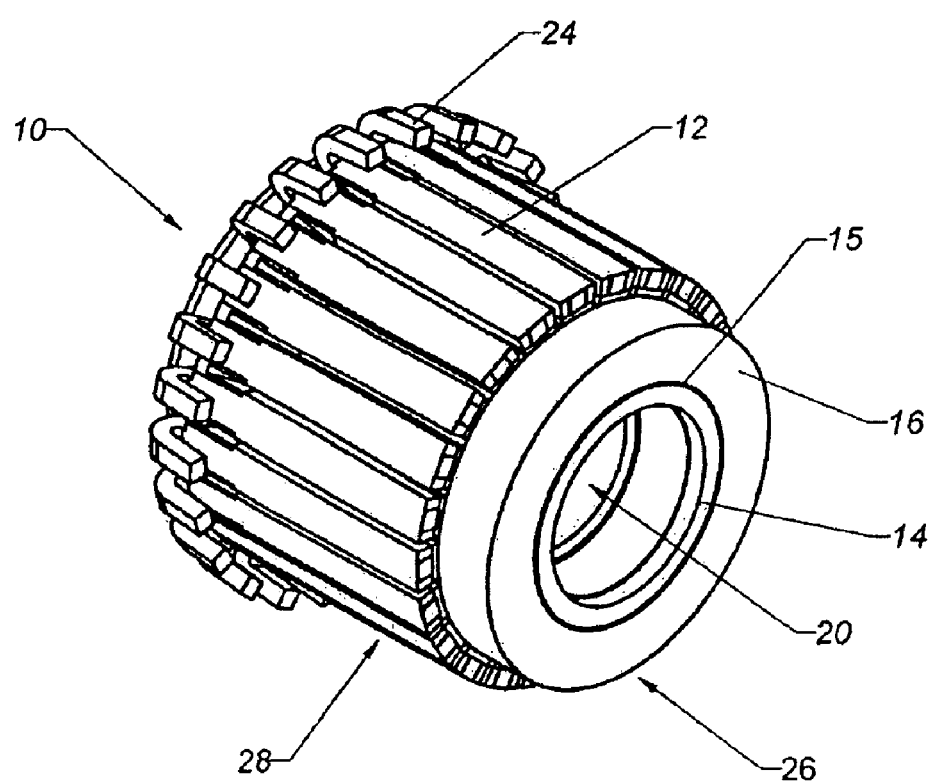
FIG. 2 is a perspective view of the embodiment of FIG. 1.
Figure 3:
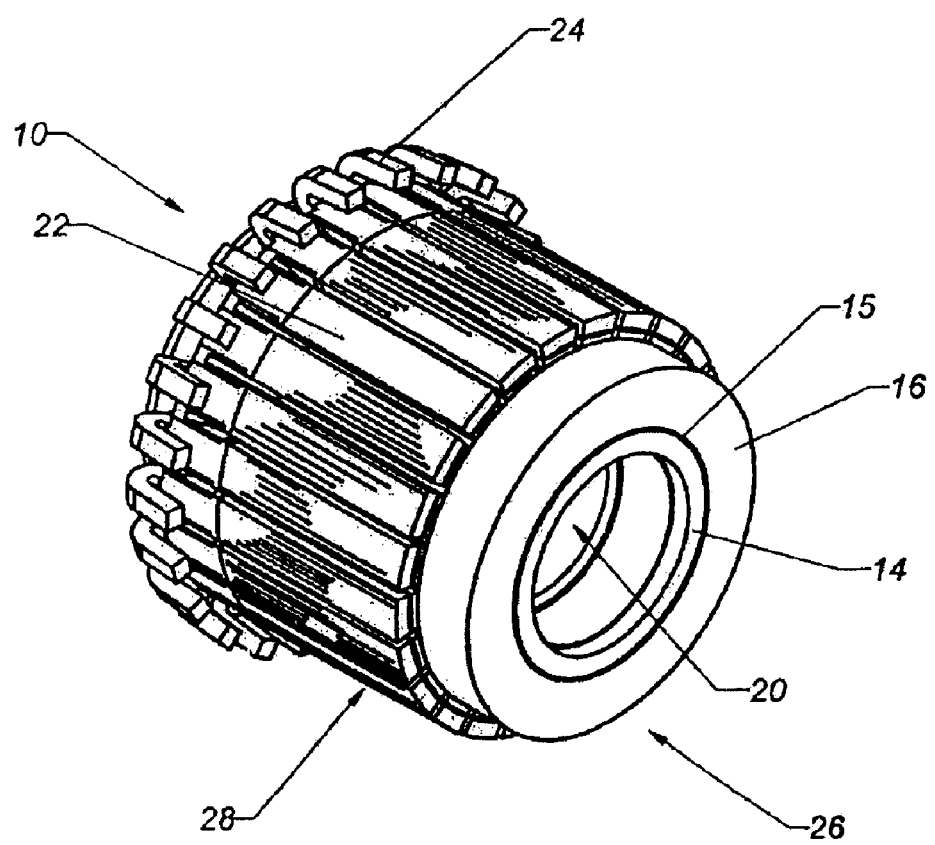
FIG. 3 is a perspective view of another embodiment of the commutator of the present invention.
Figure 4:
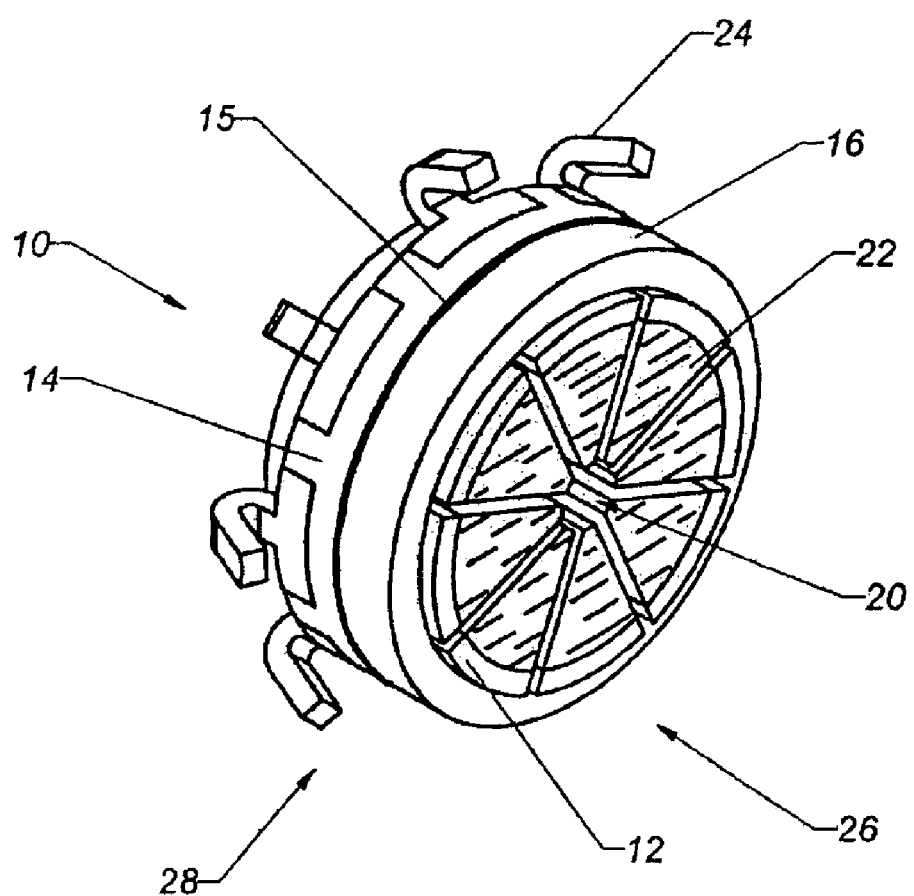
FIG. 4 is a perspective view of another embodiment of the commutator of the present invention.

While, in the embodiments of FIGS. 1 and 2, the magnet 16 is positioned on the face 26 of the commutator 10, the magnet may also be incorporated into a face-style commutator and positioned on the outer diameter of the commutator. Moreover, while the commutator 10 of FIGS. 1 and 2 relies upon the metal shell 12 for electrical conductivity, the commutator 10 may also be manufactured in accordance with the '136 Patent to include electrically-conductive pre-forms, preferably, but not necessarily, made from a carboneous material. If the carbon pre-forms 22 are positioned on the face 26 of the commutator 10, as shown in FIG. 4, the magnet 16 is preferably positioned on the barrel 28 of the commutator 10. Alternatively, as shown in FIG. 3, if the carbon pre-forms 22 are positioned on the barrel 28 of the commutator 10, the magnet 16 is preferably positioned on the face 26 of the commutator 10.

As illustrated in FIG. 5, magnetic sensors 30, such as Hall-Effect sensors, may then be used in combination with the commutator 10 of the present invention to detect and read the flux emitted from the magnet 16 on the commutator 10. Persons skilled in the relevant art will understand how to position and mount the sensors on the motor housing to read the flux lines emitted from the magnet. Because the magnet 16 is preferably of a non-electrically conductive material, it does not impact, in and of itself, the operation of the motor. Rather the output from the sensors can be used to determine operating characteristics of the motor (such as speed, angular position, acceleration, etc.) and thereby allow the user to detect and diagnose problems in the motor and adjust parameters (such as current) of the motor to impact its operation and performance.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims.

We claim:

1. A commutator comprising at least one magnet chemically-bonded to an electrically-insulating, resin-containing commutator core and further comprising a plurality of electrically-conductive commutator segments, wherein the electrically-insulating commutator core is positioned adjacent the segments and defines a central aperture and wherein the at least one magnet comprises magnetic powder and a thermo-set resin chemically bonded to the commutator core by inter-bonding of resins of the commutator core and magnet, wherein the commutator comprises a barrel and a face and wherein the electrically-conductive commutator segments are positioned on the face of the commutator and the at least one magnet is positioned on the barrel of the commutator.

2. The commutator of claim 1, wherein the resin-containing commutator core includes a phenolic material.

3. The commutator of claim 1, wherein the at least one magnet is chemically bonded to the commutator core in connection with concurrent molding of the magnet and the commutator core.

4. The commutator of claim 3, wherein the concurrent molding of the magnet and the commutator core affects inter-bonding of resins at an interface between the magnet and the commutator core.

5. The commutator of claim 1, wherein the core is molded in contact with the at least one magnet.

6. The commutator of claim 1, wherein the commutator segments comprise metal.

7. The commutator of claim 6, wherein the metal comprises copper.

8. The commutator of claim 1, wherein the at least one magnet facilitates the collection of information regarding properties of the motor.

9. A sensing assembly comprising the commutator of claim 1 and a sensor.

10. The sensing assembly of claim 9, further comprising a magnetic sensor.

11. The sensing assembly of claim 10, wherein the sensor comprises a variable reluctance sensor.

12. The sensing assembly of claim 10, wherein the sensor comprises a Hall-Effect sensor.

13. The commutator of claim 1, wherein at least one of the electrically-conductive segments comprises an inner surface and at least one anchor extending radially inwardly from the inner surface of the segment.

14. The commutator of claim 1, wherein the magnet comprises electrically non-conductive material.

15. The commutator of claim 1, wherein the magnetic powder comprises strontium ferrite.

16. The commutator of claim 1, wherein the magnetic powder comprises barium ferrite.

17. The commutator of claim 1, wherein the electrically-conductive commutator segments comprise a carboneous material.

18. The commutator of claim 1, wherein the at least one magnet is a substantially continuous ring.

19. The commutator of claim 1, wherein the at least one magnet is a substantially continuous ring.

* * * * *